June 28, 1966 T. BUDZICH 3,257,959
CONTROLS FOR REVERSIBLE VARIABLE FLOW PUMPS
Filed May 21, 1964 3 Sheets-Sheet 1

INVENTOR
TADEUSZ BUDZICH
By William N. Hogg
Attorney

June 28, 1966 T. BUDZICH 3,257,959
CONTROLS FOR REVERSIBLE VARIABLE FLOW PUMPS
Filed May 21, 1964 3 Sheets-Sheet 2

INVENTOR
TADEUSZ BUDZICH
By William N. Hogg
Attorney

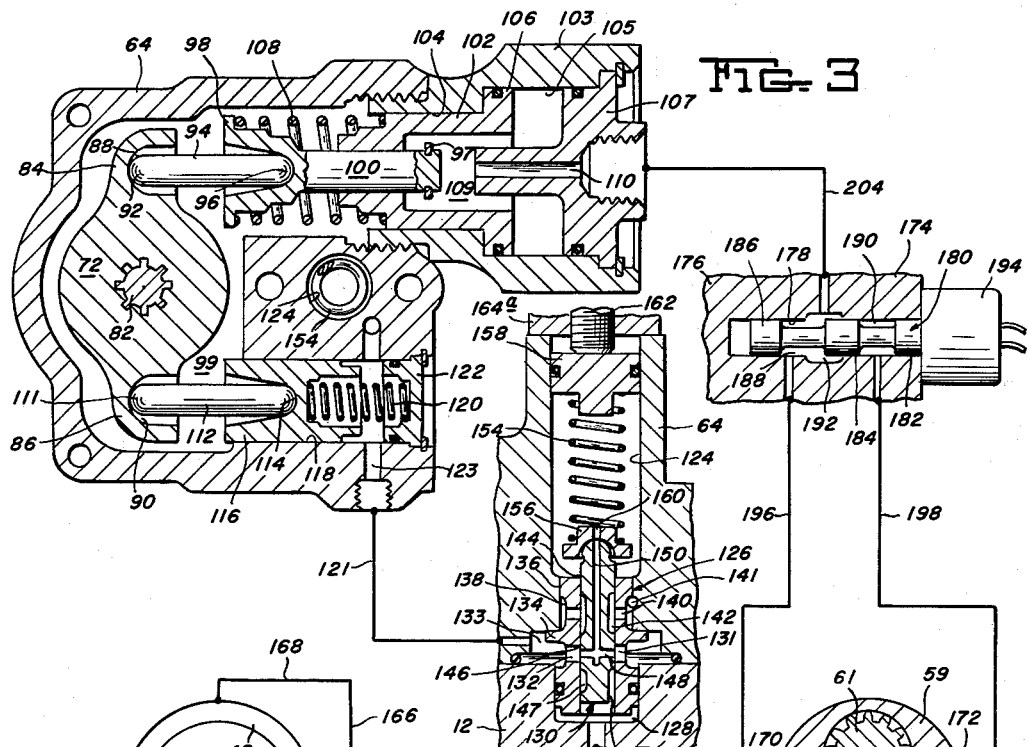

3,257,959
CONTROLS FOR REVERSIBLE VARIABLE FLOW PUMPS
Tadeusz Budzich, 3344 Colwyn Road, Cleveland 20, Ohio
Filed May 21, 1964, Ser. No. 369,163
7 Claims. (Cl. 103—162)

This invention relates generally to controls of variable flow pumps, and more particularly to variable flow pump controls in which the volume flow of the pump is varied automatically to maintain a constant preselectable discharge pressure level of the pump. In still more particular aspects this invention relates to automatic controls of variable flow pumps which permit the change of direction of the circulating fluid power through the pump while maintaining a constant preselectable pressure level at the pump ports by automatically varying the pump flow.

Variable pump controls arranged to automatically vary the volume flow of the pump to maintain a constant preselectable system pressure are well known in the art. Such controls usually employ a biasing member to move the flow changing mechanism of the variable flow pump toward a position equivalent to maximum pump flow. An opposing force signal, supplied by a control responsive to system pressure, is then supplied to the pump displacement changing mechanism. This opposing pressure responsive force signal which is in opposition to the biasing member tends to bring the displacement changing mechanism of the pump toward position equivalent to zero pump displacement with the rising system pressure. When the force signal is equal to the biasing force of the biasing member the pump will be at zero displacement. Further movement of the displacement changing mechanism beyond the point of zero pump displacement would normally reverse the direction of flow of the pressure fluid, reversing, in a well known manner, the polarity of the pump ports; and movement of the stroke changing mechanism in this over center position past the zero flow position would gradually increase the pump flow in the reverse direction until the maximum flow would be reached.

In a number of specific applications and especially in hydrostatic transmissions of traction drives it is to great advantage to be able to reverse the direction of flow of the pump while still maintaining its characteristics of the automatic flow regulating pressure compensated control. In the past the reversal of flow of a pump equipped with automatic flow control was achieved by means of a conventional four way reversing valve placed at the outlet port of the pump. In this way direction of flow was reversed within the four way valve while the pump regulated by the automatic control was supplying the flow in one direction only. The use of the four way valve which must usually be remotely controlled is not only costly but it also has the additional serious disadvantage of inducing hydraulic shock when the direction of the flow of the circulating pressure fluid is reversed. Also, the use of a four way valve for reversing direction of flow induces throttling losses thereby reducing the efficiency of the pump.

The adaptation of the automatic pressure compensated pump control to permit controlled pump operation while reversing direction of the flow through the pump by a single control is prevented by the fact that the direction of the flow through the pump can only be accomplished with the pump passing through its zero flow position. This zero flow position signifies automatically drop in system pressure. Since by definition this type of control must maintain a constant system pressure it could never project itself into the reversed flow condition which requires it to pass through the zero flow position.

It is therefore a principal object of this invention to provide an automatic pump control system arranged to vary the pump displacement to maintain a constant preselectable system pressure irrespective of direction of the pressure fluid flow through the pump.

Another object of this invention is to provide an automatic pump control system for varying the pump displacement to maintain a constant system pressure at either of the pump ports.

Still a further object of this invention is to provide a control which will provide a constant pressure by varying the pump flow at a selectable pump port thus permitting selective reversal of the direction of the flow of the pressure fluid through the pump.

Yet an additional object of this invention is to provide an automatic pump control system capable of maintaining a constant preselectable pressure level at a selectable pump port by automatically varying the pump displacement and means to unload such a control to bring the pump into zero pressure condition.

These and other objects of this invention will be apparent from the following description and drawings in which.

Figure 2:
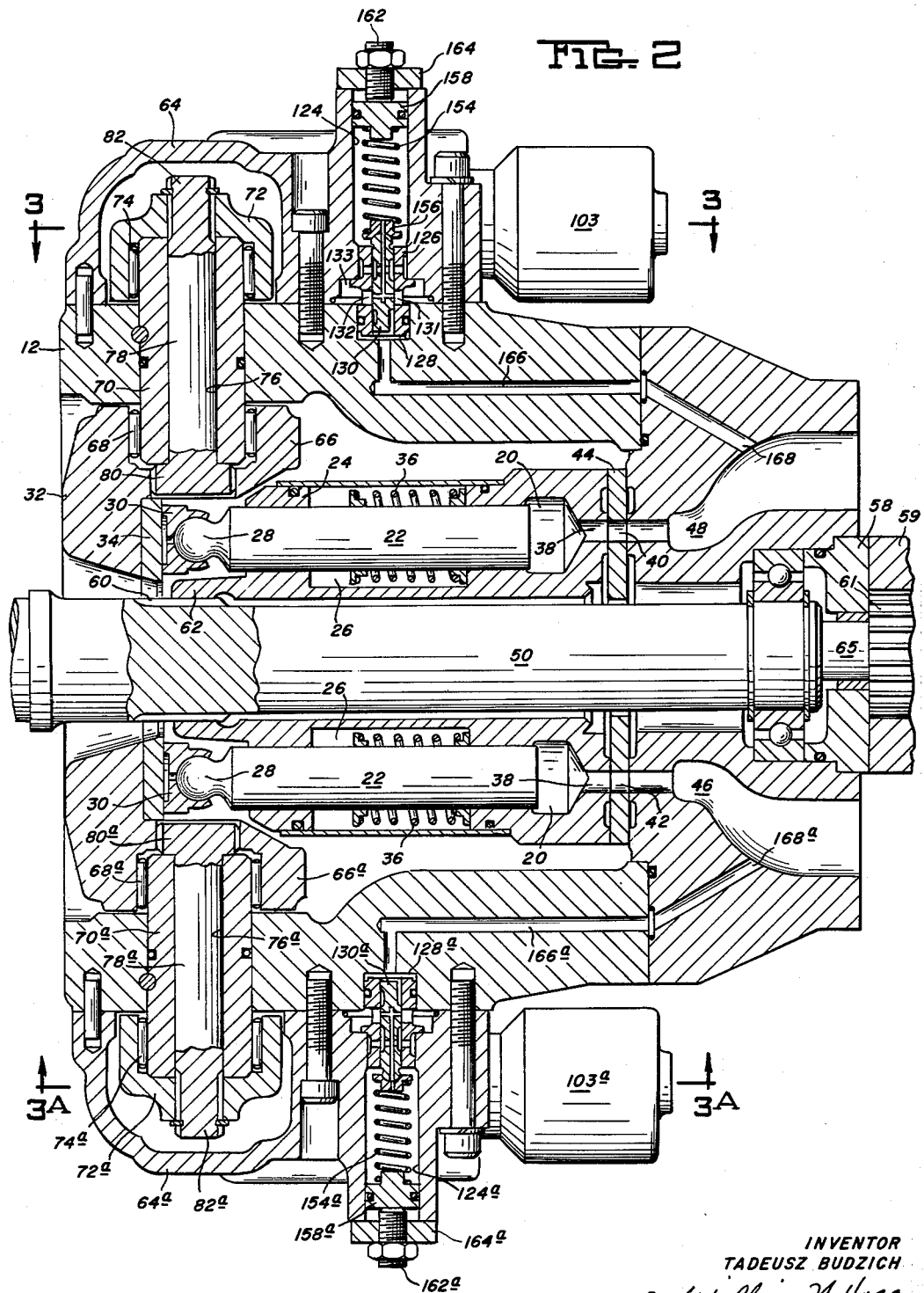
FIGURE 2 is a sectional view taken substantially along line 2—2 of FIGURE 1 showing the fluid pressure control system and the control pressure adjusting mechanism of this invention.

FIGURES 3 and 3A are a schematic showing of sectional views of various individual components of the control mechanism of this invention showing diagrammatically the fluid connections therebetween; these views being taken substantially along the line 3—3 and 3A—3A of FIGURE 2 with the pressure control valves being shown rotated 90° and moved to a position adjacent the control housings for clarity of illustration.

Figure 1:
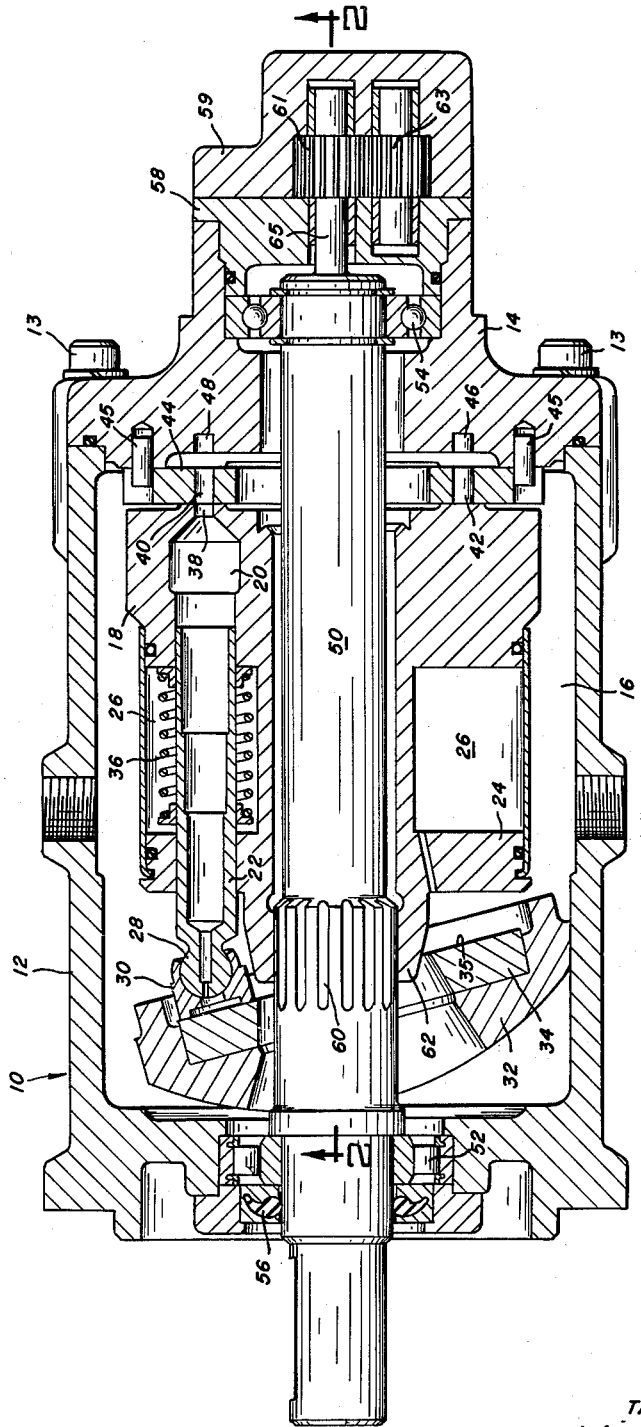
FIGURE 1 is a longitudinal sectional view of a variable displacement pump embodying this invention.

Referring now to the drawings and in particular to FIGURE 1, a variable displacement fluid pump designated generally as 10 is shown having a housing 12 connected by bolts 13 to an end cover 14 to form an internal fluid chamber 16. The pump is provided with a cylinder barrel 18 having cylindrical bores 20 within which pistons 22 are slidably mounted. The cylinder barrel 18 has a lower flange 24, which defines between itself and the main body of the barrel 18 an annular groove 26. The pistons 22 are equipped with part-spherical ends 28 universally mounting piston shoes 30. A tiltable cam plate 32 having a wear plate 34 provides an actuation surface 35 for the piston shoes 30. The pistons 22 and the piston shoes 30 are maintained in contact with wear plate 34 by means of piston return springs 36, each of which surrounds a piston 22 and is positioned within the annular groove 26. The cylindrical bores 20 communicate through passages 38 with kidney shaped ports 40 and 42 provided in a valve plate 44 which is secured to cover 14 to prevent rotation by pins 45. The ports 40 and 42 are in direct communication with pump ports 46 and 48 provided in the end cover 14. A shaft 50, which is connected to and driven by a prime mover (not shown), is journalled in the housing 12 and end cover 14 by bearings 52 and 54, respectively. The shaft 50 is sealed by a shaft seal 56 and an end cap 58. The shaft drives the cylinder barrel 18 by means of a spline 60 that is in engagement with an extension 62 of the cylinder barrel. A gear pump 59 secured to end cap 58 by bolts (not shown) contains a driving gear 61 and a driven gear 63 of conventional design. The driving gear 61 through driving gear shaft 65 is drivingly connected to shaft 50.

Referring now to FIGURE 2, the fluid pressure control system of this invention is shown. The control system includes two separate controls on opposite sides of the pump housed by control housings 64 and 64a bolted to the pump housing 12. These two control housings contain identical control elements and therefore only the control elements contained within control housing 64 will be described. (The comparable control elements in housing 64a will be designated by reference characters corresponding to their counterparts in housing 64 followed by the letter *a* as a suffix.) The cam plate 32 is provided with an annular flange 66 that circumscribes the axis about which the cam plate tilts or rotates. The flange 66 is journalled by bearings 68 on one end of a cam pin 70 extending from the control housing 64 through the housing 12. A rocker arm 72 is journalled by bearings 74 to the other end of the cam pin 70 contained within the control housing 64; hence, the axis about which the rocker arm 72 rotates coincides with the axis about which the cam plate tilts. A through longitudinal bore 76 is provided in the cam pin 70, within which a torsion shaft 78 is rotatably mounted. This shaft is provided with a splined end 80 that engages the tiltable cam plate 32 at its center of rotation and a splined end 82 that engages the rocker arm 72 at its center of rotation. Thus, tilting, or rotation of the rocker arm 72 will cause comparable tilting or rotation of the cam plate 32.

Referring now to FIGURE 3, sections through the control mechanism viewed in direction of arrows 3—3 of FIGURE 2 and an enlarged section through the valving mechanism in plane of FIGURE 2 and connections thereof are shown diagrammatically. The rocker arm 72 is provided with two opposed extensions 84 and 86 having respectively part spherical surfaces 88 and 90. The part spherical surface 88 is engaged by a mating surface 92 formed on the end of push rod 94. The push rod 94 has an opposite part spherical surface 96 which engages a spring guide 98. The spring guide 98 has a cylindrical extension 100 which is slidably mounted in unloading piston 102 which in turn is slidably guided in unloading cylinder 103 on cylindrical surfaces 104 and 105. The unloading piston 102 is provided with enlarged section 106 in sliding engagement with cylindrical surface 105. An unloading cylinder cover 107 is provided to close unloading cylinder 103. A biasing spring 108 is interposed between the spring guide 98 and the unloading piston 102 and provides the biasing force for urging the push rod 94 toward the rocker arm 72. The unloading piston 102 has an axial counter bore 109 into which cylindrical extension 100 extends and which communicates with axial bore 110 drilled through cover 107. The part spherical surface 90 of extension 86 provided on the rocker arm 72 is engaged by a mating surface 111 of push rod 112. The push rod 112 is provided with an opposed part spherical surface 114 which engages a control piston 116 slidably mounted within a bore 118 provided in the control housing 64. A biasing spring 120 is interposed between the control piston 116 and a spring cover 122 which provides a closure for the bore 118. The spring 120 supplies the biasing force for urging the push rod 112 toward the rocker arm 72.

The spring 108 is selected so that its biasing force is larger than the combined force of the spring 120 and the force of the moment applied to the cam plate 32 by the piston return springs 36.

The apparatus of the fluid pressure control system described above is actuated by a signal produced by the arrangement shown in FIGURES 2 and 3 now to be described.

The control housing 64 is provided with a control bore 124 and the housing 12 is provided with a mating bore 128. A control sleeve 126 is mounted within the bore 128 and within a portion of the bore 124. A control spool 130 is slidably mounted within the control sleeve 126. The control sleeve 126 is equipped with ports 131 and 132 that open into an annular cavity 133 which is an enlarged portion of the bore 124. The control sleeve 126 has lands 134 and 136 which define therebetween an annular groove 138. The annular groove 138 is connected by drilling 140 to annular groove 142 defined between lands 144 and 146 provided on the control spool 130. The control spool is additionally provided with a groove 147, and a relieved portion 149. A transverse passage 148 extends through the control spool and serves to connect the ports 131 and 132. The passage 148 intersects a longitudinal passage 150 provided within the control spool 130. A control spring 154 is disposed within the bore 124. This spring is compressed between a spring retainer 156, sealed within the bore 124, and a spring guide 158. The spring retainer 156 engages the control spool 130 and is equipped with a longitudinal passage 160 that connects with the longitudinal passage 150 of the control spool 130. The spring guide 158 may be moved relative to the spring retainer 156 by screw 162 positioned in a cover 164. The bore 128 is connected through passages 166 and 168 to the pump port 48 and thus kidney shaped port 40.

The gear pump, shown in section in FIGURE 1, and shown diagrammatically in FIGURE 3, is equipped with high pressure port 170 and low pressure port 172. An unloading valve, generally designated as 174 is provided and has a valve body 176 with a bore 178. The bore 178 slidably guides a spool 180 having lands 182, 184 and 186 defining therebetween annular spaces 188 and 190. The bore 178 is provided with annular groove or ring 192. The spool 180 is operated by a solenoid 194. The annular space 188 is connected through duct 196 with high pressure port 170 of the gear pump. Annular space 190 is connected through duct 198 to the low pressure port 172 of the gear pump. The low pressure port 172 in turn is connected by duct 200 with schematically shown reservoir 202. The annular ring 192 is connected through duct 204 with passage 110 of unloading cylinder cover 107.

The controls on the opposite side of the pump shown in detail in FIGURE 3A are the same as those shown in FIGURE 3, and are similarly arranged, similar parts being designated by the same reference characters having an *a* suffix. Since these controls will be operative in the over center position, bore 128a is connected to port 42, by passages 166a and 168a, which port in the over center condition of the pump will be the high pressure port.

The rotation of shaft 50 by the prime mover is transmitted by spline 60 to the cylinder barrel 18. The rotation of the cylinder barrel induces a reciprocating motion of the pistons 22 which under the bias of the return springs 36 will follow the inclined surface 35 of the wear plate 34. The reciprocating motion of the pistons causes circulation of fluid in bores 20 of the cylinder barrel which circulation in a well known manner is phased by the valve plate 44 to the pump ports 46 and 48. The volume output of the pump may be varied by changing the angle of inclination of cam plate 32 with respect to the center line of the pump. With the cam plate tilted at the maximum angle in one direction which is the position shown in FIGURE 1, the pump will supply maximum volume output, the valve plate 44 phasing the high pressure fluid into pump port 48, the pump port 46 being then the suction port of the pump. From the position as shown in FIGURE 1 rotation of the cam plate 32 in a clockwise direction toward position when it becomes perpendicular to the axis of rotation will cause a gradual decrease in the volume output. When the cam plate reaches the perpendicular position the volume output will become zero. From this perpendicular position further rotation clockwise of the cam plate 32 will start gradually increasing the volume output of the pump from zero to maximum, the maximum volume output coinciding with the maximum angular inclination of the trunnion in its over center zone of operation. Once the rotation of the trunnion brings the surface 35 past its perpendicular position polarity of the pump ports 48 and 46 will automatically change, the pump port 46 becoming the high pressure port and the pump port 48 becoming the low pressure port. The automatic control of this invention is arranged to automatically change the volume output of the pump to maintain a constant preselectable discharge pressure at either port 46 or 48 whichever is the high pressure port. In the operation of the automatic control, which will be described presently, the direction of flow of the controlled pressure fluid is selectable, the pump control changing the volume output of the pump to maintain a constant preselectable pressure level in either direction of the flow of the pressure fluid. With change of direction of the flow the angular zone of operation of the trunnion 32 from maximum to zero angle of inclination is changed to either side of the plane perpendicular to the center line of the pump. The pump control operation with the trunnion tilting the surface 35 to the side of the axis so that the kidney shaped port 40 and therefore pump port 48 are the high pressure ports. The change in volume output of the pump is then accomplished in the following manner.

The torsion shaft 78, as previously described, is connected at one end to the cam plate 32 at its center of rotation and at the other end to the rocker arm 72. Hence, any rotation of the rocker arm will cause a corresponding angular displacement of the cam plate and consequently a corresponding variation in the fluid volume output of the pump. Therefore, the volume output of the pump is controllable by rotation of the rocker arm 32 to provide a constant output pressure, and rotation of the rocker arm is in response to changes in the output pressure from the desired and preselected level as will be described presently.

As hereinbefore described, the push rods 94 and 112 are urged against the opposed extensions 84 and 86, respectively, of the rocker arm by springs 108 and 120, respectively. Since the biasing force of the spring 108 is greater than that of the spring 120 and the force of the moment supplied to the cam plate by the piston return springs 36, these forces transmitted to the cam plate will cause it to be tilted to the position of maximum output, in the absence of additional force opposing that of the spring 108. However, a force opposing spring 108 is selectively applied by means of fluid introduced to the bore 118, through passages 121 and 123. The pressure of the fluid so introduced varies in proportion to any increase or decrease in the discharge pressure of the pump above the desired pressure level. This fluid force operates on the control piston 116 to rotate the rocker arm 72 clockwise (as shown in FIGURE 3) to a degree proportional to the increase in fluid pressure above the predetermined level. This rotation of the rocker arm is transmitted to the cam plate 32, which is thus displaced proportionally to the degree of rocker arm rotation. Therefore, the resulting change in the volume output of the pump is proportional to the degree of rocker arm rotation and consequently the extent of the increase in discharge pressure level of the pump above the preselected level. The fluid pressure supplied to the bore 118 to provide this action is obtained in the following manner.

The biasing force of control spring 154 acting against the control spool 130 is balanced by the rising discharge pressure in the high pressure port 48. The high pressure fluid from this port passes through passages 168 and 166 to bore 128 and acts on the cross-sectional area of the control spool 130 to oppose the biasing force of the control spring 154. If the pressure of this fluid exceeds the biasing force of the control spring, the spool 130 will slide upwardly (as seen in FIGURE 3). This movement of the spool will connect the relieved portion 149 and the groove 147 of the control spool 130 with the ports 131 and 132. Thus the fluid will pass into the cavity 133 into which these ports open and thence through passages 121 and 123 to the bore 118 (as shown in FIGURE 3). Simultaneously, the high pressure fluid will also flow into transverse passage 148 and longitudinal passage 150 of the control spool and thence through the longitudinal passage 160 of the spring retainer 156 to the portion of the bore 124 adjacent thereto. The force exerted on the control piston 116 by the high pressure fluid in the bore 118 thereby causes the push rod 112 to rotate the rocker arm clockwise (as shown in FIGURE 3) a distance proportional to the net difference between the sum of this force and that providing the movement to the cam plate 32 by the piston return springs 36 and the biasing force of the spring 108. The rotation of the rocker arm is transmitted through torsion shaft 78 to the tiltable cam plate 32 of the pump by spline connections 80 and 82. Consequently, the cam plate is displaced by rotational movement of the torsion shaft 78 toward the perpendicular position to an extent proportional to the rotation of the rocker arm and thus the extent to which the output pressure of the pump exceeds the preselected pressure. The previously described displacement of the cam plate in this manner causes flow of the pump and therefore under any specific condition the output pressure of the pump to decrease.

The high pressure fluid entering the portion of the bore 124 adjacent to the spring retainer 156 acts in conjunction with the biasing force of the control spring 154 to oppose the force initially moving the control spool 130. When these opposing forces exceed the force provided by the high pressure fluid in passages 166 and 168, the control spool will move downwardly (as seen in FIGURE 3). The land 146 seals in the lower end of the control sleeve isolating relieved portion 149 and the groove 147 from the ports 131 and 132. This consequently stops further passage of the high pressure fluid from passage 166 to the bore 118. In addition, the movement of the control spool connects ports 131 and 132 with the annular groove 138 through annular groove 142 of the control spool. Hence, the high pressure fluid from the bore 118 is discharged into the chamber 99 which may be regarded as an exhaust zone, through passage 141. This arrangement also provides for the dischage of the fluid from the bore 124 through longitudinal passages 160 and 150, and transverse passage 148 until the control spool is in equilibrium and is thus returned to the position shown in FIGURES 2 and 3.

As previously described the biasing force of biasing spring 108 tends to rotate the cam plate toward position of maximum pump flow. The biasing force of the biasing spring 108 is supported by unloading piston 102 which in turn is supported by fluid pressure in space 109 acting on the enlarged section 106 of unloading piston 102. The cylindrical extension 100 of the spring guide 98 is free to slide in respect to unloading piston 102 thus permitting rotation of rocker arm 72 and therefore operation of the pump control. As long as sufficient fluid pressure is supplied to the space 109 to compress the biasing spring 108 and to maintain unloading piston 102 against the shoulder of bore 105 the automatic pump control will regulate the pump flow as has been described. However, when the space 109 is connected to the low pressure zone moving the valve spool 180 away from solenoid 194 to connect the bore 105 to the intake port 172 of the gear pump through duct 204, annular space 190 and duct 198 the spring 108 will move control piston 102 in respect to spring guide 98 until the relative motion of the two is terminated by spring guide stop 97 contacting piston 102. In this way the biasing force of the spring 108 is contained within these two members, the combination of spring guide 98, biasing spring 108 and unloading piston 102 being free to slide in respect to cylindrical surface 105 of unloading cylinder 103. The control in such a condition is shown in FIGURE 3A. In FIGURE 3A the port 42 is the low pressure port, with the bore 118a connected through passages 123a and 121a, cavity 133a, ports 131a and 132a, annular groove 142a, drilling 140a and passage 141a to low pressure chamber 99; and with combination of spring guide 98a, biasing spring 108a and unloading piston 102a free to slide. The control is therefore unloaded, all elements of the control being free to move and free of any control forces. Movement of the trunnion, under the action of the rocker arm 72 will cause rocker arm 72a to move which will cause the control components shown in FIGURE 3A to move freely without affecting the performance of the control shown in FIGURE 3.

To reverse the polarity of the pump, solenoid 194 is actuated to move the spool 180 away from solenoid 194, and solenoid 194a is activated to move spool 180a toward the solenoid 194a. This will connect bore 105 and space 109 to the low pressure or the inlet port 172 of the gear pump thus unloading piston 102 and deactivating the control activated therewith; and bore 105a and space 109a will be connected to the high pressure of the discharge or high pressure port 170 of the gear pump thus loading piston 102a and therefore activating the control associated therewith. The kidney shaped port 42 will then be subjected to high pressure and the kidney shaped port 40 will become the low pressure port.

In this way by connecting passages 110 and 110a to source of pressure fluid or exhaust zone the direction of flow of the pressure fluid and the polarity of the pump ports will be reversed while the automatic controls will regulate the volume output of the pump to maintain a constant preselectable system pressure at either of the pump ports depending upon which is the high pressure port. In this way, electrical signals to solenoids 194 and 194a will reverse direction of the circulating power through the pump, the pump control varying the pump flow to maintain the constant preselectable pressure level at either of the pump ports.

A control signal to solenoids 194 and 194a moves both spools 180 and 180a away from their respective solenoids to connect with the low pressure intake port 172 of the gear pump and will unload both the unloading pistons 102 and 102a. Therefore both of the controls shown in FIGURES 3 and 3A will become inactive. Hence, under action of springs 120 and 120a and piston return springs 36 the cam plate 32 will assume a position with surface 75 perpendicular to pump axis and equivalent to zero pump flow. Under these conditions the pump will remain completely unloaded in the condition of zero flow and zero pressure.

Although one embodiment of this invention has been shown and described, various adaptations and modifications may be made without departing from the scope of the appended claims.

What is claimed is:
1. In a fluid pressure energy translating device having a first and a second port, a pumping mechanism disposed to phase pressure fluid between said first and second ports, and flow changing means arranged to vary the capacity of said pumping mechanism, the improvement which comprises,
 (A) a first control system including,
  (1) biasing means disposed to urge said flow changing means to a position of maximum flow in one direction,
  (2) fluid responsive biasing means disposed to urge said flow changing means toward the position of minimum flow,
  (3) pressure responsive control means operatively interconnected with said fluid responsive biasing means of said first control system and said first port to deliver a control signal to said fluid responsive biasing means to vary the capacity of said flow changing means to maintain a relatively constant preselected discharge pressure of said device at the first port, and
 (B) a second control system including
  (1) biasing means disposed to urge said flow changing means toward a position of maximum flow in the direction opposite that of the biasing means of the first control system,
  (2) fluid responsive biasing means disposed to urge said flow changing means toward the position of minimum flow,
  (3) pressure responsive control means operatively interconnected with said fluid responsive biasing means of the second control system and said second port to deliver a control signal to said fluid responsive biasing means to vary the capacity of said flow changing means to maintain a relatively constant preselected discharge pressure of said device at the second port, and
 (C) means to selectively activate and deactivate said first and second control system, whereby the device can maintain a selectively constant discharge pressure at either of said ports.

2. The combination of claim 1 wherein said means to activate and deactivate said control systems includes a fluid pressure energy transmitting system selectably connectable to said first and second unloading control system.

3. In a fluid pressure energy translating device having a first and a second port, a pumping mechanism disposed to phase pressure fluid between said first and second ports, and flow changing means arranged to vary the capacity of said pumping mechanism, the improvement which comprises,
 (A) a first control system including,
  (1) spring biasing means disposed to urge said flow changing means to a position of maximum flow in one direction,
  (2) fluid responsive biasing means disposed to urge said flow changing means toward the position of minimum flow.
  (3) pressure responsive control means operatively interconnected with said fluid responsive biasing means of said first control system and said first port to deliver a control signal to said fluid responsive biasing means to vary the capacity of said flow changing means to maintain a relatively constant preselected discharge pressure of said device at the first port, and
 (B) a second control system including
  (1) spring biasing means disposed to urge said flow changing means toward a position of maximum flow in the direction opposite that of the biasing means of the first control system,
  (2) fluid responsive biasing means disposed to urge said flow changing means toward the position of minimum flow,
  (3) pressure responsive control means operatively interconnected with said fluid responsive biasing means of the second control system and said second port to deliver a control signal to said fluid responsive biasing means to vary the capacity of said flow changing means to maintain a relatively constant preselected discharge pressure of said device at the second port, and
 (C) unloading means to selectively activate and deactivate said first and second control system, including
  (1) a first fluid activated system disposed to provide a reaction force to said spring biasing means of said first control system,
  (2) a second fluid activated system disposed to provide a reaction force to said spring biasing means of said second control system, and
  (3) means to selectively provide fluid pressure to said first and second fluid activated systems.

4. The combination of claim 3, wherein each of said fluid activated systems includes piston means operatively connected to their respective spring biasing means and slidably mounted in a piston bore, and said means to selectively provide fluid pressure to said first and second fluid activated systems including valve means to selectively supply pressure fluid to said piston means.

5. The combination of claim 3 wherein said unloading means includes an independent fluid pumping mechanism.

6. In a fluid pressure energy translating device having a first and a second port, a pumping mechanism disposed to phase pressure fluid between said first and second ports, and flow changing means arranged to vary the capacity of said pumping mechanism, the improvement which comprises, (A) a first control system including,
  (1) spring biasing means disposed to urge said flow changing means to a position of maximum flow in one direction,
  (2) fluid responsive biasing means disposed to urge said flow changing means toward the position of minimum flow,
  (3) pressure responsive control means operatively interconnected with said fluid responsive biasing means of said first control system and said first port to deliver a control signal to said fluid responsive biasing means to vary the capacity of said flow changing means to maintain a relatively constant preselected discharge pressure of said device at the first port, and
(B) a second control system including
  (1) spring biasing means disposed to urge said flow changing means toward a position of maximum flow in the direction opposite that of the biasing means of the first control system,
  (2) fluid responsive biasing means disposed to urge said flow changing means toward the position of minimum flow,
  (3) pressure responsive control means operatively interconnected with said fluid responsive biasing means of the second control system and said second port to deliver a control signal to said fluid responsive biasing means to vary the capacity of said flow changing means to maintain a relatively constant preselected discharge pressure of said device at the second port, and
(C) unloading means to selectively activate and deactivate said first and second control system, including
  (1) a first fluid activated system including a first piston slidably disposed in a first bore, and operatively connected to the spring biasing means of said first control system,
  (2) a second fluid activated system including a second piston slidably mounted in a second bore and operatively connected to said spring biasing means of said second control system,
  (3) gear pump means having a discharge port, and
  (4) valve means disposed to selectively connect the first and second bores to the discharge port of said gear pump.

7. In a fluid pressure energy translating device having a first and a second port, a pumping mechanism disposed to phase pressure fluid between said first and second ports, and flow changing means including a tiltable cam plate arranged to vary the capacity of said pumping mechanism, the improvement which comprises, (A) a first control system including,
  (1) spring biasing means disposed to urge said cam plate to a position of maximum flow in one direction,
  (2) fluid responsive biasing means disposed to urge said cam plate toward the position of minimum flow,
  (3) pressure responsive control means operatively interconnected with said fluid responsive biasing means of said first control system and said first port to deliver a control signal to said fluid responsive biasing means to vary the capacity of said flow changing means to maintain a relatively constant preselected discharge pressure of said device at the first port, and
(B) a second control system including
  (1) spring biasing means disposed to urge said cam plate means toward a position of maximum flow in the direction opposite that of the biasing spring of the first control system,
  (2) fluid responsive biasing means disposed to urge said cam plate toward the position of minimum flow,
  (3) pressure responsive control means operatively interconnected with said fluid responsive biasing means of the second control system and said second port to deliver a control signal to said responsive biasing means to vary the capacity of said flow changing means to maintain a relatively constant preselected discharge pressure of said device at the second port, and
(C) unloading means to selectively activate and deactivate said first and second control system,
  (1) a gear pump driven concomitantly with said pumping mechanism and having a high pressure fluid discharge port,
  (2) a first fluid actuated system including a first piston slidably mounted in a first bore and supporting the spring biasing means of said first control system,
  (3) a second fluid actuated system including a second piston slidably mounted in a second bore and supporting the spring biasing means of said second control system,
  (4) first duct means disposed to connect the discharge port of said gear pump to said first bore, and first valve means in said first duct means to selectively connect and disconnect said discharge port of said gear pump with said first bore through said first duct means,
  (5) second duct means disposed to connect the discharge port of said gear pump to said second bore, and second valve means in said second duct means to selectively connect and disconnect said discharge port of said gear pump with said second bore through said second duct means.

References Cited by the Examiner
UNITED STATES PATENTS 3,153,899   10/1964   Budzich et al. _____ 103—162
3,208,396   9/1965    Budzich et al. _____ 103—162

SAMUEL LEVINE, *Primary Examiner.*

R. M. VARGO, *Assistant Examiner.*